(12) United States Patent
Xu

(10) Patent No.: US 10,346,710 B2
(45) Date of Patent: Jul. 9, 2019

(54) MULTI-AGENT TRAINING OF A COLOR IDENTIFICATION NEURAL NETWORK

(71) Applicant: DATACOLOR HOLDING AG, Lucerne (CH)

(72) Inventor: Zhiling Xu, Princeton Junction, NJ (US)

(73) Assignee: Datacolor Inc., Lawrenceville, NJ (US)

(*) Notice: Subject to any disclaimer, the term of this patent is extended or adjusted under 35 U.S.C. 154(b) by 198 days.

(21) Appl. No.: 15/280,506

(22) Filed: Sep. 29, 2016

(65) Prior Publication Data

US 2018/0089532 A1 Mar. 29, 2018

(51) Int. Cl.
| G06K 9/00 | (2006.01) |
| G06K 9/46 | (2006.01) |
| G06K 9/62 | (2006.01) |
| G06N 3/02 | (2006.01) |

(52) U.S. Cl.
CPC ......... *G06K 9/4652* (2013.01); *G06K 9/6271* (2013.01); *G06N 3/02* (2013.01)

(58) Field of Classification Search
CPC ....... G06K 9/4652; G06K 9/6271; G06N 3/02
See application file for complete search history.

(56) References Cited

U.S. PATENT DOCUMENTS

| 5,506,696 | A | * | 4/1996 | Nakano | H04N 1/6055 |
| | | | | | 358/504 |
| 5,546,195 | A | * | 8/1996 | Arai | H04N 1/6088 |
| | | | | | 358/518 |
| 5,748,329 | A | * | 5/1998 | Chang | H04N 1/6033 |
| | | | | | 358/504 |
| 5,907,629 | A | | 5/1999 | Funt et al. | |
| 6,518,981 | B2 | * | 2/2003 | Zhao | H04N 1/644 |
| | | | | | 345/589 |
| 6,563,510 | B1 | * | 5/2003 | Rice | G01J 3/46 |
| | | | | | 345/530 |
| 7,180,629 | B1 | * | 2/2007 | Nishio | H04N 9/735 |
| | | | | | 348/223.1 |
| 8,208,170 | B2 | * | 6/2012 | Mo | H04N 1/6033 |
| | | | | | 358/1.9 |
| 8,634,640 | B2 | * | 1/2014 | Bhatti | G01J 3/462 |
| | | | | | 382/167 |
| 2008/0007749 | A1 | * | 1/2008 | Woolfe | G06F 17/3025 |
| | | | | | 358/1.9 |
| 2012/0131652 | A1 | * | 5/2012 | Anand | H04L 63/08 |
| | | | | | 726/6 |

(Continued)

OTHER PUBLICATIONS

Kang et al., Neural network applications to the color scanner and printer calibrations, Jounal of Electronic imaging, Apr. 1992, pp. 125-135.*

*Primary Examiner* — John B Strege
(74) *Attorney, Agent, or Firm* — Leason Ellis LLP

(57) ABSTRACT

Various embodiments of the systems and methods described herein are directed towards training an artificial neural network to identify color values of a sample by providing image data obtained through multiple image capture devices under a plurality of lighting conditions. The present invention also includes using a pre-trained neural network to identify the color values of a sample having an unknown color value by capturing an image of an unknown color sample and known color reference samples under any illumination or hardware configuration.

12 Claims, 5 Drawing Sheets

(56) References Cited

U.S. PATENT DOCUMENTS

2012/0263379 A1* 10/2012 Bhatti .................. G06T 11/001
   382/167
2013/0235398 A1* 9/2013 Bhatti .................. H04N 1/603
   358/1.9
2017/0131147 A1   5/2017 Yu et al.

* cited by examiner

MULTI-AGENT TRAINING OF A COLOR IDENTIFICATION NEURAL NETWORK

FIELD OF THE INVENTION

The present invention is directed to systems and methods for identifying colors present in an image of a color sample where the images are taken using unknown camera parameters and under unknown illuminants.

BACKGROUND OF THE INVENTION

There is often a need to capture the color of a sample and determine the closest match for the color of that sample from an existing database. For example, a user may want to find out the color of a wall or piece of furniture and search through the paint manufacturer's fan deck to identify the color. As an alternative to a tedious manual search, a colorimeter or a spectrophotometer is a more sophisticated tool to identify a color. However, such devices are both expensive and inconvenient to use. Furthermore, such specialty devices are unlikely to accompany a user on trips, scouting events or excursions.

Efforts have been made to use images taken with a camera to select color from a database. For example, U.S. Pat. No. 8,634,640 to Nina Bhatti et. al. (herein incorporated by reference as if presented in its entirety) teaches a method to select a color palette from a camera image, aided with a reference color chart. In that method, matrix transformations are used to convert images taken with an unknown illuminant to known illuminant, and thus eliminate the need of controlled illumination. However, since matrix transformations are linear operations, the method taught by Bhatti has strict requirements for the hardware used by the system. Additionally, the system taught by Bhatti is sensitive to noise, resulting in diminished performance under a wide range of operational conditions.

It has been known in the art to use Artificial Neural Networks (ANNs) to assist in color recognition. For example, U.S. Pat. No. 5,907,629, to Brian Vincent Funt et. al. (herein incorporated by reference as if presented in its entirety) teaches a method of estimating the chromaticity of illumination of a colored image consisting of a plurality of color-encoded pixels with a pre-trained neural network. However, such a system does not solve the problem associated with determining the color value of an unknown subject using a pre-trained Neural Network.

Thus, it will be helpful to have a system and a method that can utilize available cameras such as those in smartphones, to eliminate the need of controlled illumination, and have improved tolerance of nonlinearity and noise, learn and adapt to large user data sets. Therefore, what is needed in the art are systems, methods and computer program products for evaluating color values and searching for the same or various combinations thereof.

SUMMARY OF THE INVENTION

Embodiments of the present invention are directed towards systems, methods and computer program products for training an artificial neural network to identify the color of samples having unknown color values. In one particular embodiment, a plurality of image capture devices (multiple image capture agents) are used to capture images of samples and a color reference chart comprised of color reflectance samples under one of a plurality of known illuminants. Both the elements of the color reference chart and sample have a known triple of color values under a reference illuminant (such as CIE D65). Here, each image capture device is configured to transmit the captured image to a processor or a database. One or more processors having memory and configured by program code executed thereby, receive the transmitted images and extract from the transmitted images the color values of the pixels corresponding to area of the image depicting the sample color and each of the color reference or reflectance elements. The extracted color values are used to train the neural network by applying the extracted color values for a given sample and reference elements as input nodes in an input layer of an artificial neural network and assigning the known CIE color values for the sample color as the output nodes of the artificial neural network.

In an alternative configuration, the present invention is directed to systems and methods of using a pre-trained artificial neural network to estimate or identify the CIE color values of an unknown color sample. Here, an image of a reference chart, such as one having a center portion (e.g., a hole through which a test color sample is viewed) and a plurality of identical color reflectance element groups are captured by a capture device. A processor having memory is configured by program code executed thereby to extract RGB color values from the pixels representing the center portion of the sample reference chart. Likewise, the processor is configured to extract RGB color values for each of the plurality of color reference elements. The processor further provides the extracted sample RGB color values and plurality of reference RGB color values as an input to one or more input nodes of an input layer of a neural network pre-trained to identify colors. The neural network includes an output layer containing output nodes. In one particular implementation, the output nodes correspond to the CIELAB (CIE color components) values. The artificial neural network also includes at least one intermediate layer having a plurality of nodes connectible between the input and output layers. The processor, through the use of the neural network, generates at the respective output node, the color values that characterize color values of the sample color with the user illuminant rectified to a reference illuminant. These user-illuminant-independent CIE color values are compared to the entries of a color value database that use the reference illuminant. By searching the color value database, the color most closely matching the sample color is identified and provided to a user.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

By way of overview, various embodiments of the systems and methods described herein are directed towards using a pre-trained neural network to identify the CIE color values of a color sample in an image captured by an image capture device. The captured image includes both the sample color under investigation, as well as a number of color reference elements. A pre-trained neural network is used to evaluate the measured RGB values of the pixels corresponding to the depiction of a sample found within the image. Using an artificial neural network eliminates the need to capture the image under specific illuminants, orientations or with particular devices in order to obtain the CIE color coordinates of the sample.

Color Reference Chart

Figure 1B:
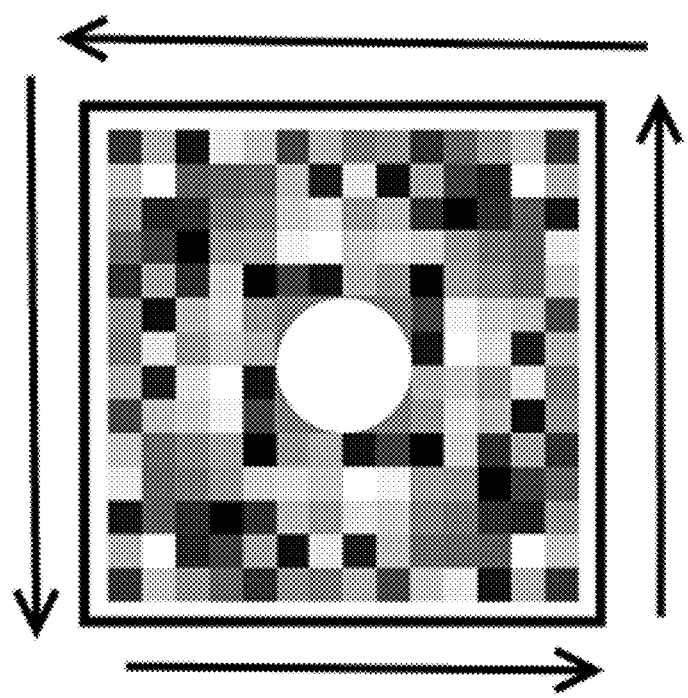
FIG. 1B illustrates an alternative view of the color reference chart according to one embodiment of the present invention.
Figure 1A:
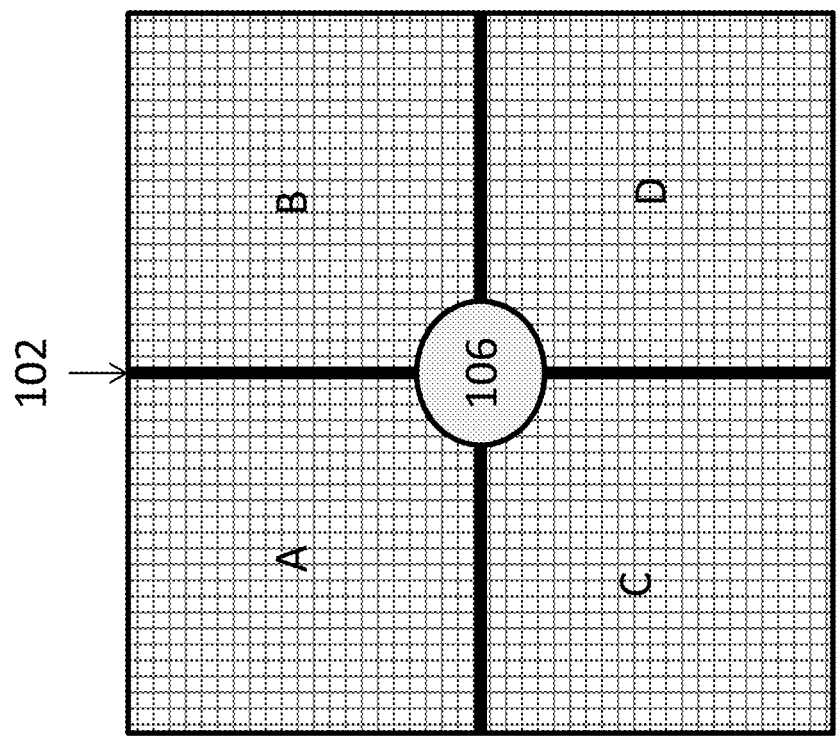
FIG. 1A illustrates the color reference chart according to one embodiment of the present invention.

A color reference chart (as provided in FIGS. 1A-B) is used to bracket the unknown color sample with a collection of known color values. As shown in FIG. 1, the color reference chart 102 includes a number of discrete color reference elements or reflectance samples. Here, the color reference chart 102 is divided into four (4) quadrants about a center portion 106. In one or more configurations, the center portion is an aperture or transparent window permitting the observation of a portion of a sample 104 when the color reference chart 102 is placed in-between the image capture device 202 and the sample 104. Alternatively, the center portion 106 is a stage or platform suitable for the placement of a sample 104 under analysis on the platform.

The four (4) quadrants of the color reference chart each contain the same number of reflectance samples. In a particular arrangement, the quadrants are arranged to be fourfold rotationally symmetric about the center portion 106. In the described arrangement, each reflectance element found within a given quadrant will have counterparts in the other quadrants. Thus, while the possible number of element groups (here referred to as quadrants) are based on particular design constraints (e.g. fourfold symmetry or threefold symmetry), the number of reflectance elements within each group will always be the same. Furthermore, each member of a group of color reflectance elements has counterpart reflectance elements in each of the remaining color reference groups. It should be noted that while each counterpart color element will have approximately the same wavelength-dependent reflectance value, variations in production of reflectance elements means that each counterpart reflectance sample will have some deviations from the known or "true" wavelength-dependent reflectance value for that reflectance element.

With reference to the specific configuration of the color reference chart, a color reference chart having four-fold symmetry presents an effective way to ensure that each section of the color reference chart has same number of elements and that the shape of the color elements can be easily tiled into the area occupied by that group without overlap or empty space. Furthermore, fourfold rotation symmetry allows the counterpart reflectance elements to be at four positions under potentially spatially non-uniform illumination. Thus, by averaging the camera values determined for a reflectance element and its matching counterparts, a RGB color value can be estimated that is representative of the camera values obtained if the reflectance element had been in the center portion 106.

Those possessing an ordinary level of requisite skill in the art will appreciate that other configurations, such as the reference elements having threefold symmetry about the sample, can be used in accordance aims described herein. With reference to FIG. 1B, quadrants A-D each are rotated 90 degrees relative to the neighboring quadrants. For example, Quadrant C represents a 90 degree counter-clockwise rotation of each element within the quadrant using the center of the reference chart as the pivot point. As shown in particular detail and described herein, each corner element of the color reference chart 102 is an identical color. Due to four-fold rotational symmetry, the color directly below the corner element in Quadrant A, is the same color as the element directly to the right of the corner element in Quadrant C.

In one particular embodiment, the provided color reference chart includes 45 color reference elements. Thus, where there are four quadrants, the color reference chart provides at least 180 color references for use in connection with the artificial neural network system. However, other groups and numbers of colors are also possible and envisioned.

Sample

In one arrangement, the sample 104 captured by the image capture device is a color fan, or color fan deck providing a range of known colors values. As described in more detail herein, known CIE color value data is used in combination with measured RGB data from the image capture device in order to train the artificial neural network. The sample 104 can also be any object where the CIE color value of the object is unknown or in need of clarification. For example, where a fan deck of colors has been used to train the neural network, an object having an unknown color value can be matched to one of the colors in the fan deck.

Image Capture Device

Figure 2:
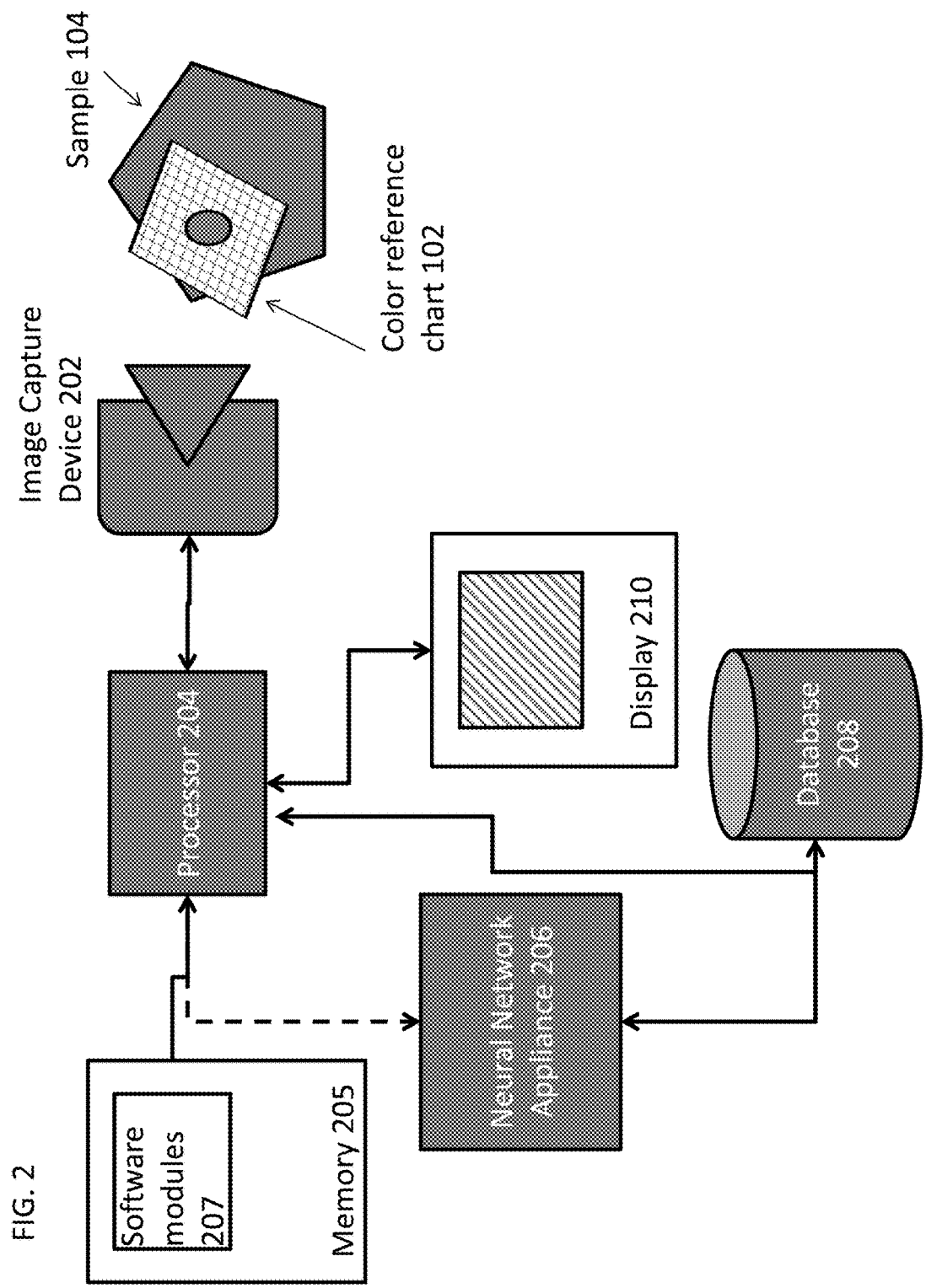
FIG. 2 illustrates a block diagram of a color search utilizing a neural network according to one embodiment of the present invention.

With general reference to FIG. 2, the color reference chart 102 is placed in-front of a sample 104 in need of analysis. As an example, the color reference chart 102 is placed over a sample 104 having a paint color of particular interest. An image capture device 202 is used to capture an image of both the image reference chart 102 and the color of the sample 104, such as by capturing the color of the sample 104 through aperture. Upon acquisition of the image, the image capture device 202 transmits the captured image to a processor 204. The image capture device 202 transmits the image as a binary stream, bit string, pixel array, file or collection of files or other suitable format for the processor 204 to evaluate.

Where the image capture device is used to acquire an image of a color sample having known CIE values, a collection of camera types or configurations can be used. For instance, multiple images of the same sample can be captured using different image capture devices, such as different smart-phone cameras. Likewise, similar make and model image capture devices can be used under different illuminants to capture a collection images having slight variation in measured RGB color values due to differences in hardware.

In a particular arrangement, the image capture device 202 is one or more cameras or image acquisition devices such as CMOS (Complementary Metal Oxide Semiconductor), CCD (charged coupled device) or other image acquisition devices and associated hardware, firmware and software. The image capture device 202, in accordance with one embodiment, is integrated into a smartphone, tablet, cell phone, or other portable computing apparatus. In a further embodiment, the image capture device 104 is an "off the shelf" digital camera or web-camera that is connected to the processor 204 using standard interfaces such as USB, FIREWIRE, Wi-Fi, Bluetooth, and other wired or wireless communication technologies suitable for the transmission image data.

Computer or Processor

The image obtained by the image capture device 202 is transmitted to one or more processor(s) 204 for evaluation. The processor 204 is configured through one or more modules to determine corrected color values for the sample color based on an analysis of the image color values by a pre-trained neural network. The corrected color value is used to search repository, such as a database 108 or other storage location containing a listing of color values and associated names or labels and output the results to a user through a display 210.

With further reference to FIG. 2, the processor 204 is a computing device, such as a commercially available cellphone, smartphone, notebook or desktop computer configured to directly, or through a communication linkage, receive images captured by the image capture device 202. The processor 204 is configured with code executing therein to access various peripheral devices and network interfaces. For instance, the processor 204 is configured to communicate over the Internet with one or more remote servers, computers, peripherals or other hardware using standard or custom communication protocols and settings (e.g., TCP/IP, etc.).

In one configuration, the processor 204 is a portable computing device such as an Apple iPad/iPhone® or Android® device or other commercially available mobile electronic device executing a commercially available or custom operating system, e.g., MICROSOFT WINDOWS, APPLE OSX, UNIX or Linux based operating system implementations. In other embodiments, the processor 204 is, or includes, custom or non-standard hardware, firmware or software configurations. For instance, the processor 204 comprises one or more of a collection of micro-computing elements, computer-on-chip, home entertainment consoles, media players, set-top boxes, prototyping devices or "hobby" computing elements. The processor 204 can comprise a single processor, multiple discrete processors, a multi-core processor, or other type of processor(s) known to those of skill in the art, depending on the particular embodiment.

In one or more embodiments, the processor 204 is directly or indirectly connected to one or more memory storage devices (memories) to form a microcontroller structure. The memory is a persistent or non-persistent storage device (such as memory 205) that is operative to store the operating system in addition to one or more of software modules 207. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 204 provides for the storage of application program and data files. One or more memories provide program code that the processor 204 reads and executes upon receipt of a start, or initiation signal. The computer memories may also comprise secondary computer memory, such as magnetic or optical disk drives or flash memory, that provide long term storage of data in a manner similar to the persistent memory device 205. In one or more embodiments, the memory 205 of the processor 204 provides for storage of application program 207 and data files when needed.

Acquiring the Image Data

Figure 3:
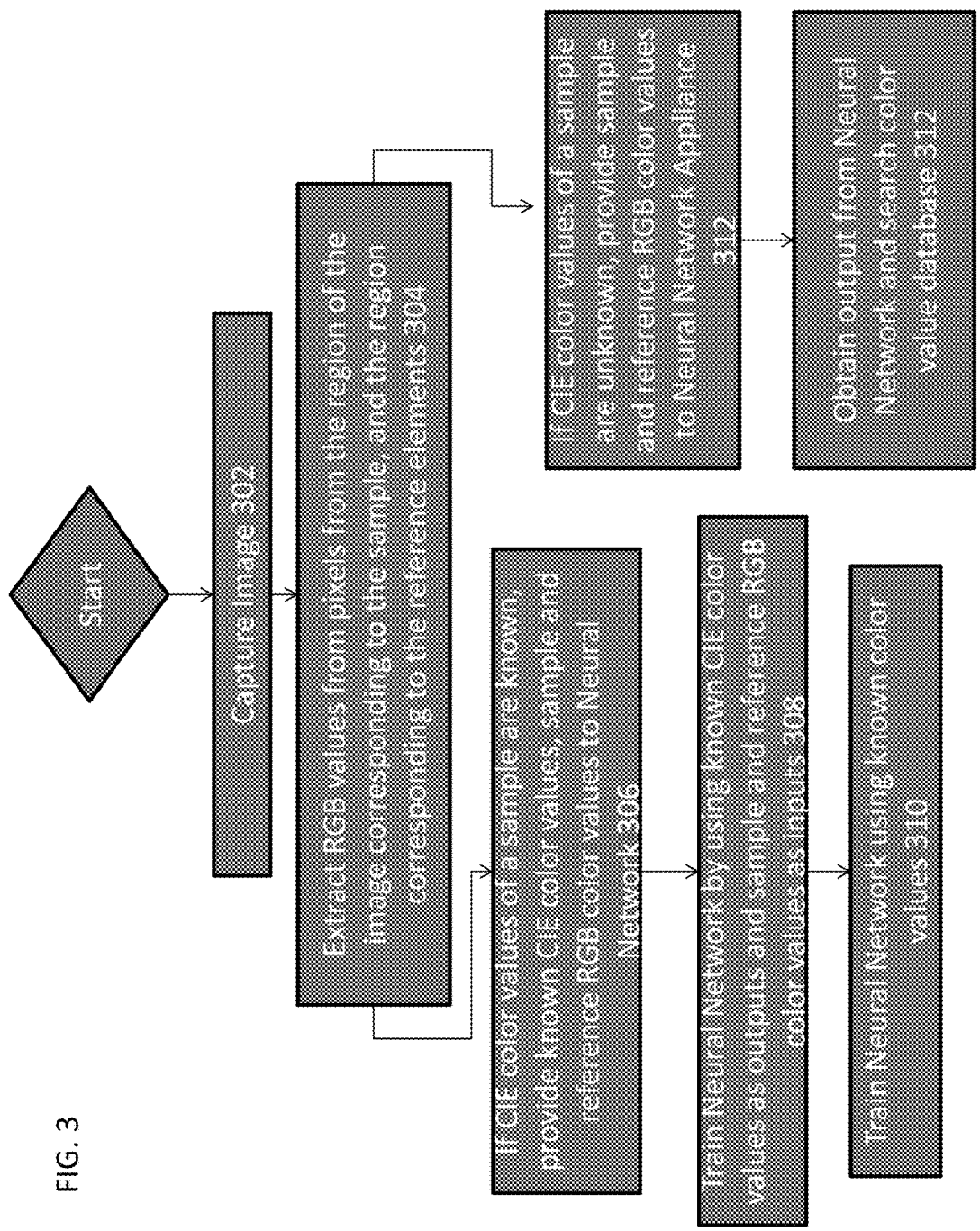
FIG. 3 presents a flow diagram detailing the steps taken in one embodiment of the color searching system according to one embodiment of the present invention.
Figure 4:
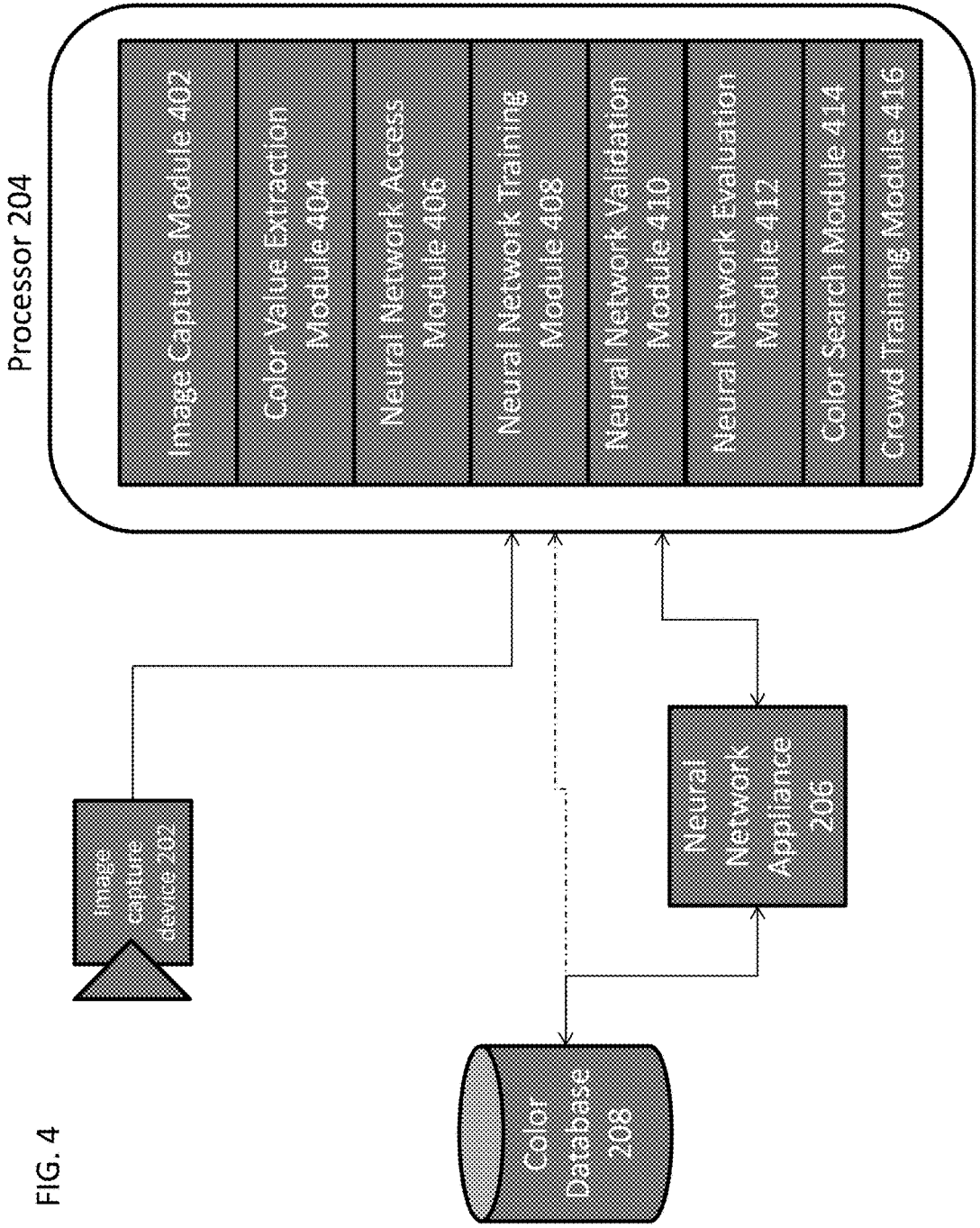
FIG. 4 presents a block diagram detailing specific components of the color searching system according to one embodiment of the present invention

As shown with reference to FIGS. 3-4, the processor 204 is configured by code stored in the memory. Such code includes one or more software modules that configure the processor 204 to instruct the image capture device 202 to capture an image of the color reference chart and sample 104. For example, the processor 204 is configured by an image capture module 402 to capture the image as provided in step 302 of the work flow of FIG. 3. The captured image includes pixel data that corresponds to the color of the sample under investigation as well as color information for each of the reference elements arranged about the aperture of the reference chart 102.

The color value extraction module 404 configures the processor 204 to extract RGB color values from the pixels corresponding to the color reference elements as well as pixels corresponding to the aperture. According to step 304, the processor 204 extracts the color information by one or more image analysis procedures implemented as sub-modules of the color value extraction module 404.

In one non-limiting example, the processor 204 is configured by one or more image analysis submodules to identify features of interest within the image. Here, the features identified within the image are the individual reflectance elements and the aperture of the color reference chart from the acquired image. Upon identification of the relevant features in the image, the processor 204 extracts color values corresponding to each reference element. As an example, the average RGB values for the area corresponding to a particular reference element are calculated and stored as the measured color value for a given location within the image. Here, the image analysis sub module evaluates the relative difference in pixel color values between each corner element and the color elements in direct contact with the corner element. In the illustration provided in FIG. 1, the two reference elements in direct contact with the corner elements have different hues. The arrangement of the elements, as determined on hue difference provides sufficient information to determine the orientation of the quadrants.

Where the color reference chart contains two or more identical color elements distributed (such as four elements in the four fold rotationally symmetric arrangement) the processor 204 can be configured to average the measured color values for the materially equivalent samples to determine an average measured color value for a specific color found in the color reference elements. By averaging the measured values for each of the elements having the same known color value, the averaged measurement is used by the processor 204 to compensate spatial inhomogeneity of the illuminant and obtain an estimation of the RGB color values for the reflectance sample as if it were placed in the center portion 106. However, other arrangements, such as selecting a preferred color reference element as representative of a specific color value are also envisioned.

In a further arrangement, the color values extracted according to step 304 are RGB color values. Upon extraction of the color values for the sample and reference elements, the color values are stored in the local or remote memory 205. Using the color reference chart of FIG. 1B, for each image processed by the processor 204 configured by the color extraction module 404, a data object or objects referencing the RGB reading of the sample color and the 180 reference colors are generated.

In one particular implementation, the RGB readings of the sample and the reflectance elements are transformed or manipulated in order to format the values for use in the artificial neural network. For example, a normalization submodule of the color value extraction module 404 normalizes the RGB values extracted to the range of [0, 1] prior to further processing. However, in other arrangements, the RBG values obtained from the images are stored in the original format or form.

Those skilled in the art will appreciate for the foregoing that the extracted RGB color values can be used in accordance with the present invention to either train a neural network to identify CIE color values of known color samples or to identify, using a pre-trained neural network, the CIE color values of unknown color samples. In both instances an artificial neural network is employed to evaluate the extracted pixel data.

Artificial Neural Network

The processor 204 is configured by the program code 207, such as through the neural network training module 406 or neural network evaluation module 408 to evaluate the color values data extracted from the image captured by the image capture device 102.

As a broad overview, artificial neural networks (ANN) are interconnected networks of nodes used to estimate or approximate functions that depend on a large number of inputs that are generally unknown. The outputs provided by the neural networks are the results of a process of iterative weighting and transforming values until an estimate of some condition or final value(s) based on the input data is determined.

Figure 5:
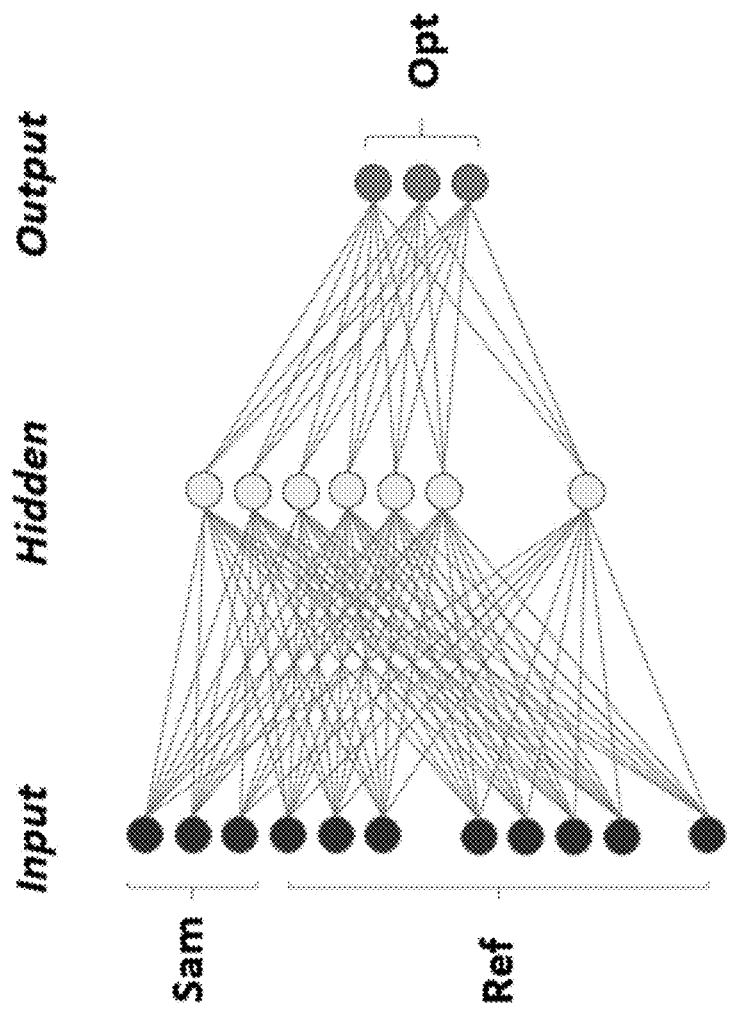
FIG. 5 presents a graph diagram detailing a representative node layer arrangement of an artificial neural network used to identify color values according to one embodiment of the present invention.

With reference to FIG. 5, the nodes of an ANN are organized into layers and are used to transform and weight input data from a source(s) (such as pixel data corresponding to an image) according to one or more algorithms. In a particular configuration, the neural network has three (3) or more layers. For example, a neural network implemented by the processor 204 has three (3) layers: an input layer, a hidden layer, and an output layer. In configurations where there are more than three (3) layers, it is typical to have two (2) or more hidden layers.

The source data provided to the input layer nodes are distributed to nodes located in the hidden layer. In one or more configurations, a single input node provides an output value to one or more hidden layer nodes. Thus, in a particular embodiment each hidden layer node is configured to accept multiple input signals. The nodes of the hidden layer combine input signals directed to a specific hidden layer node and compare the combined (and weighted) values to an activation function in order to determine an output signal. The output signal generated by each node in the one or more hidden layers is distributed to one of more nodes in the next layer of the network. Upon reaching the output layer, the output nodes are configured to accept multiple inputs and, through the use of an activation function, generate an output signal or value.

If the signal propagates from one node to another, then that path can be defined and assigned initial weight values to transform the input into the output. However, for an ANN to provide useful output values based on input values, the entire ANN is trained so that for a given set of inputs, an anticipated set of outputs is provided. Training an ANN includes adjusting the weights provided for the paths connecting individual nodes.

As provided herein the neural network is a software application stored in a memory location locally accessible by the processor 204. Alternatively, FIG. 2 provides (in dashed lines) that the neural network is stored on a remote appliance 206 accessible by the processor 204. For example, the neural network is stored or hosted in a remote accessible storage device (e.g. cloud storage and hosting implementation) that allows for dynamically allocated additional processors, hardware or other resources on an "as-needed" or elastic need basis. A database 208 is in communication with the neural network appliance, whether local to the processor 204 or hosted remotely. The database 208 is configured to store data used to train the ANN.

Training the Artificial Neural Network to Recognize Colors

With respect to the step 306, the ANN is trained by using an image of a sample having known CIE color values. By way of example, the ANN is trained using a collection of images taken of various sample colors, such as a fan deck of colors provided by a paint or color supplier. In a particular embodiment, the image capture device captures an image of the color sample (e.g. a given color of the fan deck) along with the reference chart. In one arrangement, the ANN training procedure 306 includes acquiring images of 206 different known CIE color values samples, along with the color reference chart, under at least three (3) different illuminants (D, H and S). In a further arrangement, multiple agents or image capture devices are used to capture the sample images. Thus, the input data provided during neural network training process includes images of sample colors under different illuminants and taken using different image capture devices. Through the use of different cameras or image capture devices, the artificial neural network is trained to evaluate images taken with a number of different hardware platforms. In this way, variations in sensor response to colors and illuminants are presented to the neural network, thus providing a more robust training set than if a single type of image capture device or illuminant were used.

The neural network training module 406 configures the processor 204 to extract the RGB color values from the sample and/or reference elements of each image and store the RGB values in database 208 for each illuminant. Thus, the neural network appliance uses data from three databases dbD, dbH and dbS each having 206 records. In order to ensure that the known color values are correct, a commercial spectrophotometer (Datacolor 45G®) measures the reflectance of the 206 color samples in the range of 400 nm to 700 nm with 10 nm interval. Based on the spectrophotometer measurements, CIELAB values (D65 Illumination, 10° Observer) are calculated for each color. The measured values are normalized to the range of [0, 1] for ease of processing by the ANN. Those values are then used as the standard output for ANN training as well as performance checking.

In one particular embodiment, the ANN has three layers: the input layer has total 543 nodes, the hidden layer has total 69 nodes, and the output layer has total 3 nodes. The 543 input nodes can be divided into 2 groups: Sam (sample) and Ref (reference) as provided in FIG. 5. The Sam nodes include the RGB color values of the sample, and Ref includes the RGB color values of all the reference colors from the same image of the Sam. The three (3) output nodes are called Opt (Output), and provide the output values of the ANN as CIE color values. In a particular implementation, the CIE colors are CIELAB values. In the calculation of the ANN, a bias node can be added in both the input layer and the hidden layer, and a sigmoid function is used as the activation function at each node.

According to ANN training step 308, the processor 204 is configured by the neural network training module 408, to select a record from the memory or database containing the RGB color values for the sample and reference elements, as well as the CIE color values (such as CIELAB values) for a particular training image. The processor 204 provides the sample and reference element RGB color values to the input nodes of the ANN, and sets the output node values to match the CIELAB values of the known sample color. Without limitation to the internal workings of various types and forms of ANN, by setting the output to the known CIE color (e.g. CIELAB) values, the weights connected the node layers will be adjusted so as to correct the input values to determine the pre-set output value. Thus, where previously a known conversion or transformation process was applied to each of the color values to compensate for different illuminations or angles, the ANN uses machine learning to adjust those weights and transformation functions without the need of user input or control.

The training step 308 is repeated for each entry in the database or color records for a particular illuminant, and for each database of illuminants. The processor 204 is further configured to validate the ANN. To evaluate the performance of a given database, the processor 204 using the validation module 410 selects a record in the database and inputs the sample and reference values as inputs. The ANN will output color values based on the submitted inputs values as the result of its training. An output value check submodule of the validation module configures the processor to compare the output values of the ANN to the known CIELAB values for that entry. Where the ANN has received sufficient training, the values of the Opt layer will substantially match the CIE color (such as CIELAB) values of the same sample color in the same record in the database.

Distributed ANN Training

In one or more further embodiments, the processor is configured to permit individual users of a distributed (remotely hosted) ANN to collectively train the ANN. Here, individuals follow the steps 302-304 provided. However, instead of training the ANN using a predetermined illuminant database, each user takes an image of a known color sample either alone or with the reference color chart. As provided in step 310, individual users having access to a remotely accessible ANN appliance are able, through the crowd training module 416, to train the ANN using collections of images obtained on a variety of hardware platforms and lighting conditions. In this embodiment, the individual users are each an agent of the multi-agent training system, such that each user's image capture device can have variations in hardware and software that will impact the color values measured. Where a remote user has access to the color reference chart, the user captures an image of a sample having known CIE color values. The CIE color values, along with information about the image capture device and local processor(s) are collected and transmitted to the ANN appliance. In this arrangement, the ANN is thus trained on different hardware conditions. As a result, the ANN can be trained for specific devices (e.g. iPhone) or lighting conditions (e.g. sunset) that are of particular interest to users. The data is provided as an input to the ANN and the known CIE color values are provided as a pre-set output values. A distributed network is used to train the ANN using a multitude of devices and illuminant conditions. By collecting large amount of crowd based training data, the chance for a particular user to find the proper color in the standard database will increase, even if various noises are buried in the crowd based training data.

For a crowd based training dataset, once a large amount of information has been provided to the ANN and stored in one or more databases 208, the processor can provide additional input layers to the ANN based on specific parameters, such as type of smartphone, or for a particular group of people, or for a particular geographic area, etc., to better train the ANN and to provide more accurate color searching results for said parameters. In a further arrangement, the crowd training module 416 configures the processor to generate new input nodes for the ANN in response to the type of data being submitted. For example, the processor 204 is configured through one or more submodules to determine on the basis of one or more hardware parameters, additional input nodes for use in the ANN. One or more input nodes indicating a particular make, model or version of image capture hardware, software or a combination thereof, is used to train the ANN to be more accurate with respect to particular devices.

In one particular embodiment, a database of known CIE color values (such as database 108) is filtered for a specific hardware platform (e.g. iPhone® image capture devices). The results of the filtering are presented to the ANN. Here the ANN is trained to identify CIE color values from samples acquired from a specific hardware platform.

Evaluating Unknown Color Samples

Once trained, the ANN is used to identify the CIE color values of samples having unknown CIE color values. Since the ANN utilizes nonlinear activation functions, the output can be a nonlinear transformation of the input. Practically, the ANN appliance is well suited to color searching since color space is highly nonlinear and the camera image sensor responses to color space is also not strictly linear.

Returning to the flow chart of FIG. 3, if the CIE color values of a sample captured in the image according to step 302-304 is unknown, then the processor 204 is configured by the neural network evaluation module 412 to evaluate the RGB color values of the sample and reference elements of the image under analysis and output proposed CIE color values. The output CIE color values are used to search the color databases(s), such as by using a color search module 414 to identify the color having the highest match, which in most cases will be the true color of the sample under standard conditions irrespective of the user-illuminant used during capture.

In one or more configurations, the user is able to select a hardware or software profile prior to searching the color database using the ANN. For example, a graphical user interface is provided to a user indicating one or more hardware profiles (e.g. make and model of smartphone) to select from. By selecting a particular hardware profile, the processor 204 is configured to access an ANN specifically trained on training data tailored to the selected hardware profile. Alternatively, the processor is configured to adjust or manipulate weights within the ANN in response to the selection of a hardware profile.

General Information

While this specification contains many specific embodiment details, these should not be construed as limitations on the scope of any embodiment or of what can be claimed, but rather as descriptions of features that can be specific to particular embodiments of particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems are cited throughout this application, the disclosures of which are incorporated herein by reference. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the points that follow, the respective features recited in those points, and by equivalents of such features.

What is claimed is:

1. A system for training a neural network to output estimated CIE color values of a sample having unknown color values, the system comprising
   at least one image capture device, where the at least one image capture device is configured to capture an image of at least one color sample and a color reference chart comprised of known color reference elements, the color reference chart including a plurality of reference color element groups, wherein each of the plurality of reference color element groups includes a matrix of color reference elements, each color sample having known CIE color values, and wherein the image capture device is configured to capture the image of the at least one color sample and color reference chart under at least one of a plurality of known illuminants, each image capture device configured to transmit the captured image;
   a processor having memory configured by program code executed thereby to:
     receive the transmitted images;
     obtain the known CIE color values corresponding to the color sample;
     extract from the transmitted images the RGB color values of the pixels corresponding to area of the image depicting the sample and the reference color elements and
     train the neural network using the plurality of images and corresponding known CIE color values, where training of the neural network includes:
       for each image, apply the extracted RGB color values for the sample and the reference color elements as input nodes in an input layer of an artificial neural network and assign the known CIE color values for the sample color as the output nodes of the artificial neural network.

2. The neural network training system of claim 1, wherein the color reference groups are arranged to have fourfold rotational symmetry about the sample.

3. The neural network training system of claim 1, wherein the image capture device is configured to transmit the known color value of the sample along with the captured image.

4. The neural network training system of claim 1, wherein the processor is configured by code executing thereby to access the pre-determined color value from one or more storage devices accessible to the processor and store, for each image, the RGB color values of the pixels corresponding to area of the image depicting the sample and the reference color elements.

5. The neural network training system of claim 1, wherein the processor is further configured to:
   access from a storage location accessible by the processor, a collection of image data objects, where each image data object includes the RGB color values of the pixels corresponding to area of the image depicting the sample, the reference color elements of a subset of the plurality of extracted RGB values for a given image, and the known CIE color values for the sample;
   evaluate the RGB color values as input node values of the neural network;

receive the output of the neural network as CIE color values for color sample;
compare the output CIE color values to the known CIE color values stored in the image data object; and
provide an alert to a user of the neural network where the known CIE values and the output CIE values are not substantially similar.

6. The neural network training system of claim 1, wherein each image device is configured to transmit a hardware profile to the processor along with the captured image.

7. The neural network training system of claim 6, wherein the training of the artificial neural network further includes:
storing the captured image data and associated hardware profile in one or more databases;
filtering the entries of the database for images captured with a particular hardware profile to obtain a hardware specific image dataset;
applying the hardware specific image dataset as input node values of the artificial neural network.

8. The neural network training system of claim 6, wherein the hardware profile of at least one image capture device differs from the hardware profile of at least one other image capture device.

9. The neural network training system of claim 1, wherein at least one image of the sample is captured under each of the plurality of illuminants.

10. The neural network training system of claim 1, wherein each image capture device is remote to the processor and configured to transmit the captured image via a wireless communication channel.

11. A system for training a neural network to output estimated CIE color values of a sample having unknown color values, the system comprising:
at least one image capture device, where each image capture device is configured to capture an image of at least one color sample and a color reference chart comprised of known color reference elements, the color reference chart including one or more reference color elements, the at least one color sample having a known CIE color value, and wherein the image capture device is configured to capture the image of the at least one color sample and color reference chart under at least one of a plurality of known illuminants, each image capture device configured to transmit the captured image;
a processor having memory configured by program code executed thereby to:
receive the transmitted images;
obtain the known CIE color values corresponding to the color sample;
extract from the transmitted images the RGB color values of the pixels corresponding to area of the image depicting the sample and the reference color elements and
train the neural network using the plurality of images and corresponding known CIE color values, where training of the neural network includes:
access from a storage location accessible by the processor, a collection of image data objects, where each image data object includes the RGB color values of the pixels corresponding to area of the image depicting the sample, the reference color elements of a subset of the plurality of extracted RGB values for a given image, and the known CIE color values for the sample;
evaluate the RGB color values as input node values of the neural network;
receive the output of the neural network as CIE color values for color sample;
compare the output CIE color values to the known CIE color values stored in the image data object; and
provide an alert to a user of the neural network where the known CIE values and the output CIE values are not substantially similar.

12. A system for training a neural network to output estimated CIE color values of a sample having unknown color values, the system comprising
at least one image capture device, where each image capture device is configured to capture an image of at least one color sample and a color reference chart comprised of known color reference elements, the color reference chart including one or more reference color elements, the at least one color sample having a known CIE color value, and wherein the image capture device is configured to capture the image of the at least one color sample and color reference chart under at least one of a plurality of known illuminants, each image capture device configured to transmit the captured image and a hardware profile of the image capture device used to capture the image;
a processor having memory configured by program code executed thereby to:
receive the transmitted images and hardware profile;
obtain the known CIE color values corresponding to the color sample;
extract from the transmitted images the RGB color values of the pixels corresponding to area of the image depicting the sample and the reference color elements and
train the neural network using the plurality of images and corresponding known CIE color values, where training of the neural network includes:
storing the captured image data and associated hardware profile in one or more databases;
filtering the entries of the database for images captured with a particular hardware profile to obtain a hardware specific image dataset;
applying the hardware specific image dataset as input node values of the artificial neural network.

* * * * *